United States Patent
Mark et al.

(10) Patent No.: US 6,278,776 B1
(45) Date of Patent: Aug. 21, 2001

(54) OUTBOUND SWITCH PACING

(75) Inventors: Lawrence P. Mark, Trumbell; Paul Zmuda, Stratford, both of CT (US)

(73) Assignee: SER Solutions, Herndon, VA (US)

( * ) Notice: Subject to any disclaimer, the term of this patent is extended or adjusted under 35 U.S.C. 154(b) by 0 days.

(21) Appl. No.: 08/996,157

(22) Filed: Dec. 22, 1997

(51) Int. Cl.[7] ................................................. H04M 3/42
(52) U.S. Cl. ........................ 379/265; 379/309; 379/201
(58) Field of Search ..................... 379/265, 266, 379/201, 309, 207, 127, 242

(56) References Cited

U.S. PATENT DOCUMENTS

| | | | |
|---|---|---|---|
| 5,179,589 | * 1/1993 | Syu | 379/266 |
| 5,185,780 | * 2/1993 | Leggett | 379/266 |
| 5,247,569 | * 9/1993 | Cave | 379/266 |
| 5,295,184 | * 3/1994 | Smith et al. | 379/266 |
| 5,327,490 | * 7/1994 | Cave | 379/266 |
| 5,327,491 | * 7/1994 | Syu | 379/266 |
| 5,343,518 | * 8/1994 | Kneipp | 379/266 |
| 5,436,965 | * 7/1995 | Grossman et al. | 379/266 |
| 5,467,391 | * 11/1995 | Donaghue, Jr. et al. | 379/266 |
| 5,495,523 | * 2/1996 | Stent et al. | 379/266 |
| 5,519,773 | * 5/1996 | Dumas et al. | 379/265 |
| 5,553,133 | * 9/1996 | Perkins | 379/266 |
| 5,561,711 | * 10/1996 | Muller | 379/266 |
| 5,570,419 | * 10/1996 | Cave et al. | 379/266 |
| 5,621,790 | * 4/1997 | Grossman et al. | 379/266 |
| 5,640,445 | * 6/1997 | David | 379/266 |
| 5,844,980 | * 12/1998 | Patel et al. | 379/266 |
| 5,889,799 | * 3/1999 | Grossman et al. | 379/266 |
| 5,907,601 | * 5/1999 | David et al. | 379/266 |
| 5,926,528 | * 7/1999 | David | 379/266 |

* cited by examiner

*Primary Examiner*—Ahmad Matar
*Assistant Examiner*—William J. Deane, Jr.
(74) *Attorney, Agent, or Firm*—Andrew C. Aitken; Venable

(57) ABSTRACT

In an outbound call management system, calls to dial are placed in a buffer queue before transfer to the outbound switch. The rated switch capacity (i.e., X calls per minute) is divided into small submultiples (i.e., Y calls per second) such that short term switch capacity will not be exceeded. Calls are transferred from the queue at the submultiple rate or less depending upon the number of calls in the queue. The time scale is small enough that this instantaneous rate at which calls can be transferred from the queue to the switch does not exceed the instantaneous capacity of the switch. If calls are being placed into the queue at a faster rate than they are sent to the switch, the number of calls in the queue will increase. The call management system will see a resultant apparent increase in the number of placed but unanswered calls. The call management system uses the number of available trunks as a factor when calculating the number of calls to dial, if the number of calls in the queue exceeds a certain number, the call management system will interpret the situation as one in which all the trunks are in use. In this situation, the call management system reduces the number of calls to be dialed.

4 Claims, 3 Drawing Sheets

OUTBOUND SWITCH PACING

BACKGROUND OF THE INVENTION

1. Field of the Invention

This invention relates to an improved outbound call management system and, more particularly, to a system which smoothly matches the number of calls dialed to the outbound telephone switch capacity.

2. Description of the Prior Art

Call origination management systems automatically dial clients, listen for the call result (i.e. ringing, busy signal, answer, no answer, etc.), and when a call results in an answer, automatically transfer the call to an available agent. Such systems are in general use today by a variety of businesses, groups and organizations.

FIG. 1 shows a system overview of a typical system in use today. A system typically includes a call manager CPU 11, a call manager interface 13, telephone switch 17, trunks 19 and a memory such as a hard disk storage 15. A plurality of outbound telephone trunks 19 are connected to the call manager interface 13 via switch 17 and also to the agent headsets. A plurality of agent voice and data stations 21 are also connected to the system. The number M of these voice and data agent stations may be, for example, 24 for the case where the number of telephone trunks is 48. In other words, the number M of the voice and data agent stations is less than the number of telephone trunks. This allows the system unit to dial calls while all operators are busy talking to clients.

As illustrated in FIG. 1, each of the voice and data agent stations comprises a combination video display terminal (VDT) and keyboard, and a telephone headset and microphone. As will be appreciated by those skilled in the art, prior art call manager systems, such as those commercially available from applicant's assignee and others, include routines for gathering, manipulating and storing data relating to each call in a campaign. This data includes call duration data, after-call work duration, and call answer to dial call data.

The first step in beginning a calling campaign is to obtain the calling data, typically via tapes, disks, or through a communication link to a host computer. The data is input, and the system then organizes the data into the records for the campaign. When the campaign is started, the data is loaded into the "input call list." The system then preloads a dialing queue with a certain number of records from the calling data. As the dialing process begins, the system controls the number of calls being made at any one time based on the number of operators that are available to receive calls and the maximum allowable abandon call rate. An abandon call is a call that has been dialed, answered, but for which there is no available agent to respond to the answering party. These abandon calls are also referred to in the art as nuisance calls. The abandon call rate as used herein is the ratio of abandon calls to answered calls expressed as a percentage. The maximum abandon call rate is a rate which the system supervisor can select, usually in a range between 1% and 15%.

When a connection is established to a client, the system routes the call to an available agent and displays the client's record on the agent's screen. The agent is now ready to make a presentation to the client and record information from the transaction. Once the agent completes the call and any after-call work, the system then makes the agent station available for another call.

The system validates the client's record in an output call list, and depending on the outcome of the call, separates the record in the corresponding output file. For example, if the particular person to be contacted is not at home, the operator may press a key telling the system to place the client's record into the call-back file. When, for example, a call results in a future follow-up call, the agent presses another key to immediately print information of the transaction on a printer.

Records which require no further action (i.e. a sale is made, wrong number, etc.), are marked complete and are not put into the call-back file but instead are put in a sale file.

The goal of any call origination management system is to have each agent connected to each call answered without having the agent wait between calls or the called party having to wait for an agent after he or she answers. Under ideal conditions, there would be maximum talk time and no abandon calls, so-called nuisance calls. To accomplish this, however, requires a prior knowledge of the time it takes to connect a call and exactly how long each operator talks. In practice, both of these can be highly variable, within limits. the system cannot predict exactly when or if a placed call will result in an answer and, of course, the amount of time an operator talks will depend on the responses of the client. Therefore, scheduling the next answered call to occur exactly when an operator finishes talking, is impossible. An answer may occur before or after the operator finishes the previous call, and the result is an increase in the abandon call rate. It is clear that the system variables which affect talk time are the ratio of answered calls to the number of call attempts per session ($A_{ratio}$) and the average time an agent is busy per or an increase in operator idle time, or both. Intuitively, call in the session ($CON_{time}$). The system goal is a maximum talk time per agent with abandon calls kept below a preset level.

There are a number of call pacing methods in present commercial use. In general, these prior pacing methods attempt to predict when an agent will be available to respond to an answered call, and dial sufficient calls so that there will be an answered call for every available agent with a minimum time between the end of one call and the beginning of the next. The performance of these prior art pacing methods is generally satisfactory in a specific calling environment for which they are targeted and when operating with large number of agents and a high acceptable percentage of abandon calls. Their performance drops when used outside their targeted environment and when used with a small number of agents and/or a low acceptable percentage of nuisance calls.

Prior art dialing algorithms do not satisfactorily account for the fact that the outbound telephone switch has a maximum rate at which calls can be launched. With a large agent pool, and a sufficiently low hit rate, the system may attempt to launch more calls than the outbound telephone switch can handle. The prior art uses a simple "circuit breaker" mechanism. Outbound switches are rated as to the number of calls per minute they can handle. With a switch limit X calls per minute, if the number of call launches any minute exceeds X, the prior art systems reject all further calls until the next minute. There are two drawbacks to this simple system.

1. Since the granularity of protection is one minute, the switch can be overloaded at the start of each minute, until the number of calls exceeds X, when the load falls to zero. Although our average load will be within limits, the instantaneous load can be above limits.
2. Rejecting calls has an adverse effect on dialing algorithms. When calls are rejected, the dialing algorithm sees the hit rate drop, and will increase the launch rate. The exact opposite of what is needed if the outbound switch is already overloading. Rejecting calls in this situation leads to more dials being rejected, and thrashing within the system. This thrashing can lead to system failure.

SUMMARY OF THE INVENTION

An object of this invention is the provision of a call management system which provides both long term and short term balance between the switch capacity and the number of calls to dial.

Another object of this invention is the provision of a call management system which prevents thrashing when the number of calls to dial exceeds the switch capacity.

Briefly, this invention contemplates the provision of an outbound call management system in which calls to dial are placed in a buffer queue before transfer to the outbound switch. The rated switch capacity (i.e. X calls per minute) is divided into small submultiples (i.e. Y calls per second) such that short term switch capacity will not be exceeded. Calls are transferred from the queue at the submultiple rate or less depending upon the number of calls in the queue. The time scale is small enough that this instantaneous rate at which calls can be transferred from the queue to the switch does not exceed the instantaneous capacity of the switch. If calls are being placed into the queue at a faster rate than they are sent to the switch, the number of calls in the queue will increase. Since the call management system will see a resultant apparent increase in the number of placed but unanswered calls. The call management system uses the number of available trunks as a factor when calculating the number of calls to dial, if the number of calls in the queue exceeds a certain number, the call management system will interpret the situation as one in which all the trunks are in use. In this situation, the call management system reduces the number of calls to be dialed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT

Figure 1:
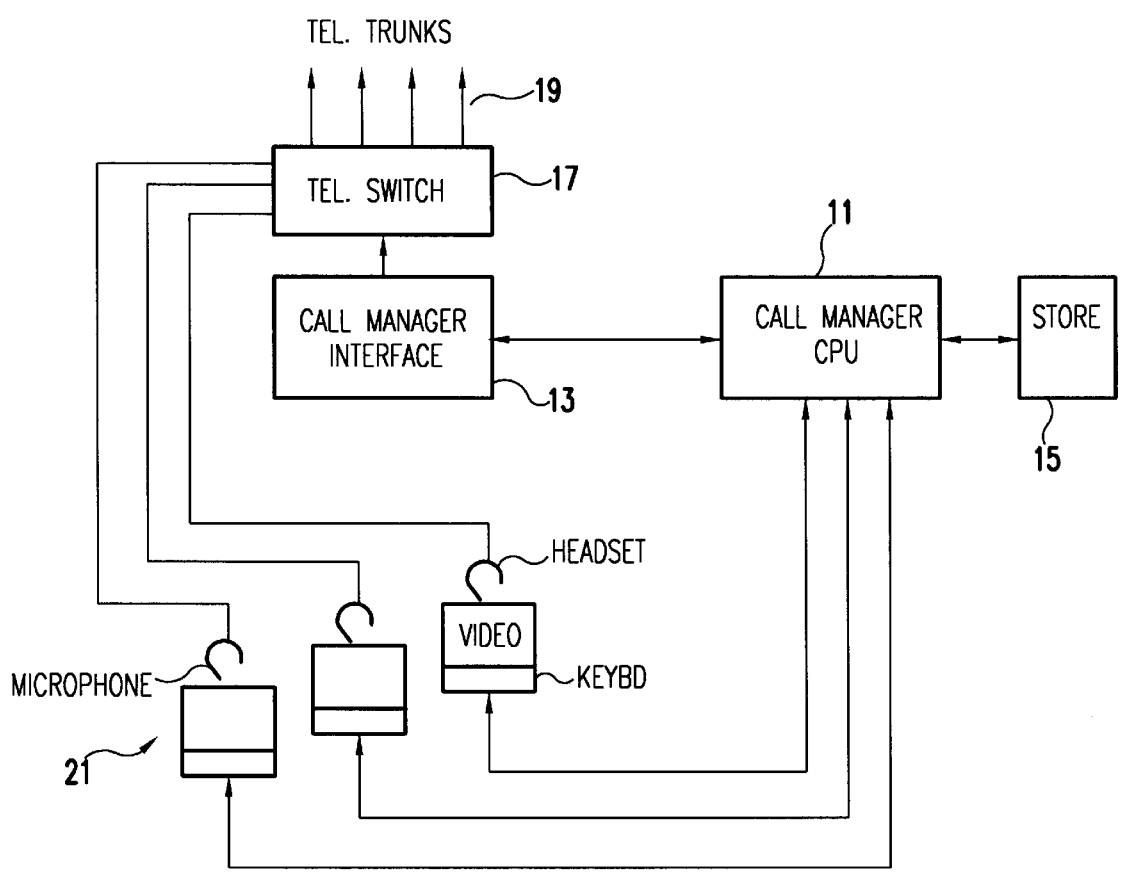
FIG. 1 is a block diagram of a typical prior art outbound call management system to which the teachings of this invention are applicable.
Figure 2:
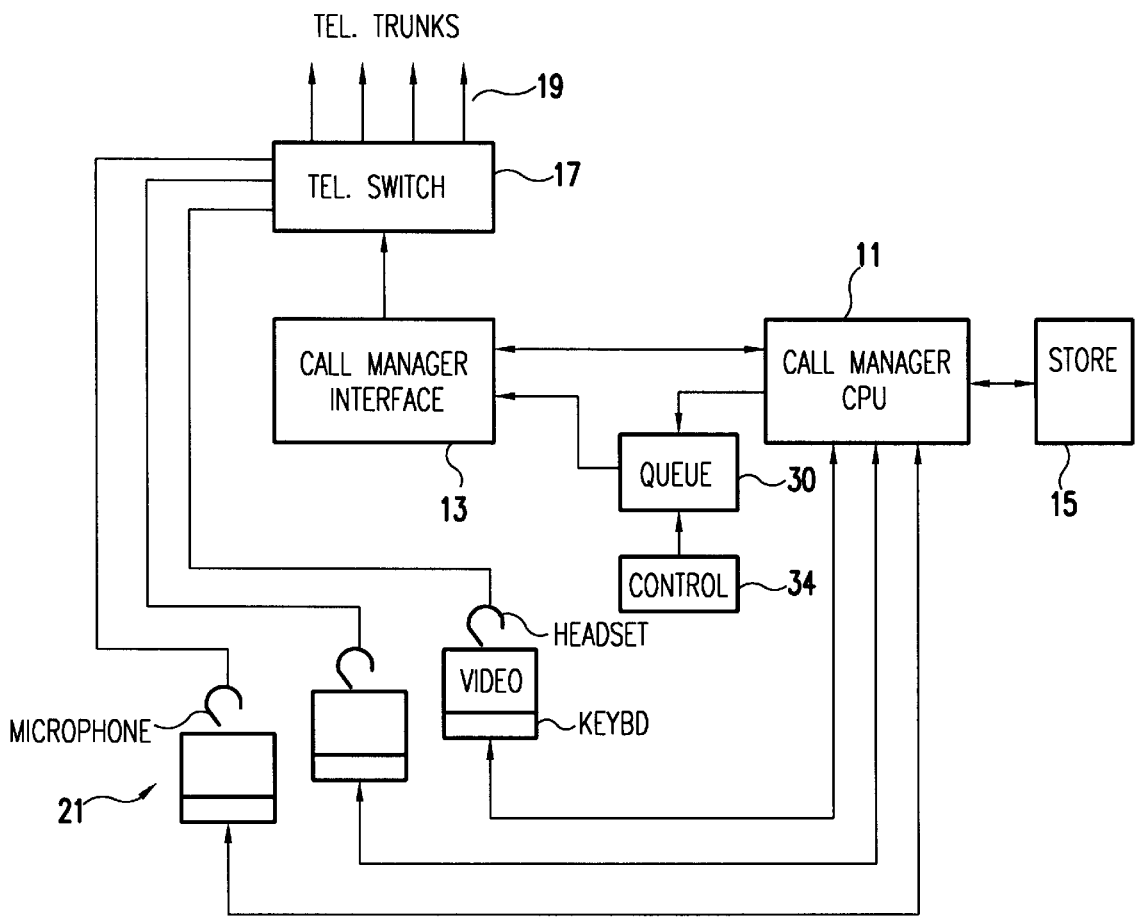
FIG. 2 is a block diagram of one embodiment of a system in accordance with the teachings of this invention.
Figure 3:
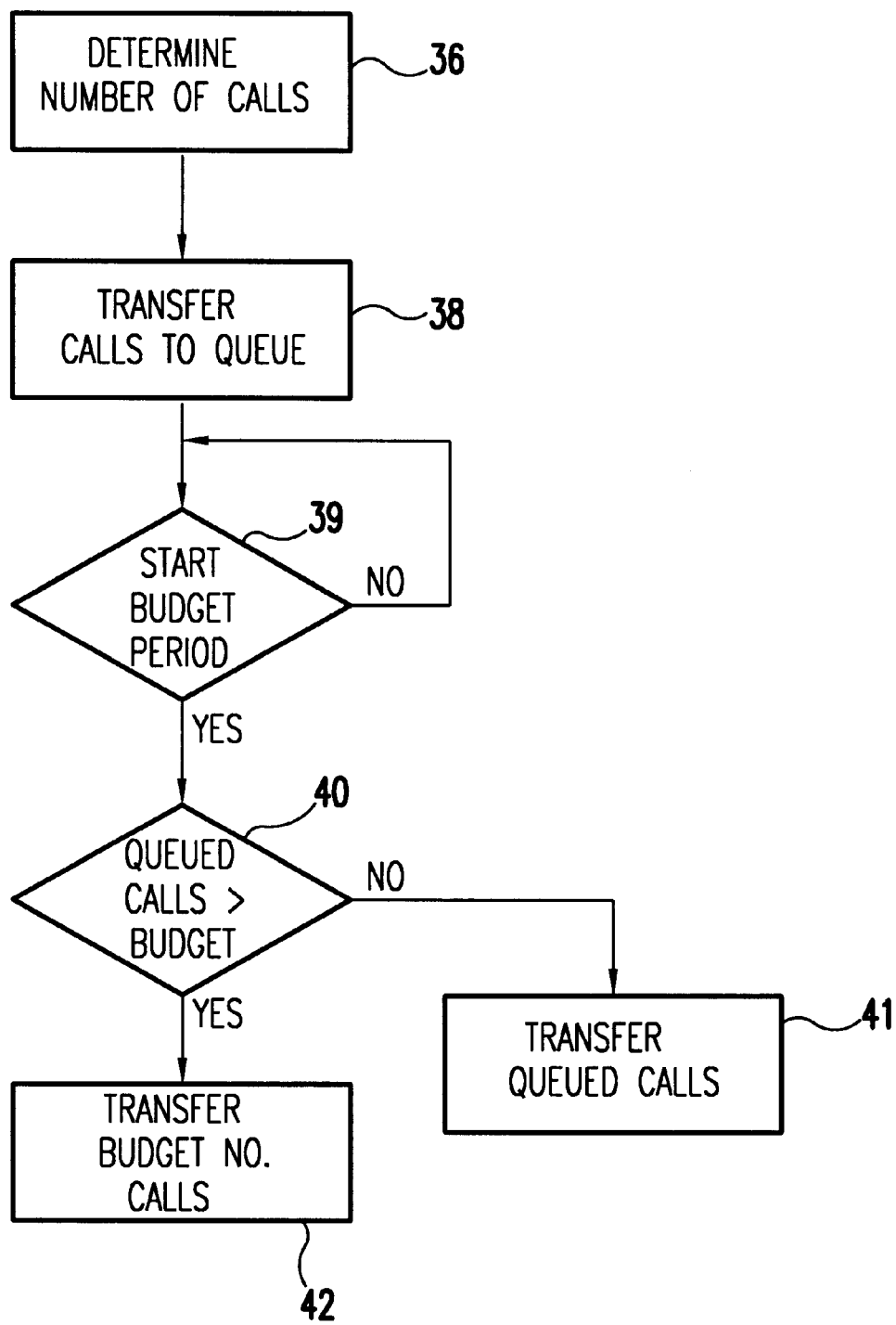
FIG. 3 is a flow diagram of the operation of the system in accordance with the teachings of this invention.

Referring now to FIGS. 2 and 3, in accordance with the teachings of this invention, a queue 30 and controller 34 are logically positioned between the call manager CPU 11 and the telephone switch 17. Preferably, (not shown here) the queue 30 and a controller can be physically incorporated in the call management interface 13. The switch 17 is, for example, a G3 switch available from Lucent Technologies Corporation, which is rated in the number of calls it can handle in a one minute period of time. In accordance with the teachings of this invention, the controller divides this rated call volume into a number of smaller budgets (e.g. sixty budgets), with the number of calls in each budget preferably distributed as evenly as possible. With the switch rated in calls per minute, and this rated call volume broken into sixty budgets, it will be appreciated that each budget represents the number of calls that can be launched in a one second time period. The total of the budgets adds up to the rated call volume. FIG. 3 is a flow diagram of the operation. The call manager CPU 11 calculates a number of calls to dial in block 36 at a rate intended to keep the agents occupied without exceeding an acceptable abandon rate. This number of calls is transferred to the queue in block 38. At the start of each budget period, block 39, calls are transferred from the queue 30 to the switch 17. If in decision block 40, the total calls in the queue do not exceed the budget, the calls in the queue are transferred to the switch 17, block 41. If the number of calls in the queue exceeds the budget number, no more calls are transferred once the budget number has been transferred in a budget period, block 42. This addresses both of the problems previously explained.

1. Operating on a one second granularity instead of a one minute granularity keeps the system within limits on both an average and an instantaneous basis.
2. If the calls transferred to the switch 17 do not keep up with the requested dial rate, calls are not rejected, and the systems do not thrash.

The dialing algorithm adapts to the queuing mechanism. There are three cases to consider.

1. The dial rate is within the capacity of the switch 17. The dials will come off the queue within a second, and the queuing will have no impact on the dialing algorithm.
2. A short duration burst of calls for dialing. This could be caused by a large number of agents joining a campaign. The queuing will stretch the burst of requested dials out over a time period and, the dialing algorithm will see the average time to connect go up slightly. However, when the new agent pool starts receiving calls, the system returns to steady state dialing and the time to connect will return to normal.
3. A campaign requires a sustained high dialing rate. If the steady state dialing rate required to keep the agents productive is greater than the capacity of the switch 17, then new requests will be added to the dialing queue faster than they are being sent to the dialer. The dialing algorithm is unaware of the call queuing and it operates on an assumption that each call is sent to the call manager interface 13 and is dialed, using a trunk. The call pacing algorithm treats trunks as limited resources, and reduces the dial rate when it assumes all trunks are in use. In this case the dialing algorithm operates in a trunk bound mode, and will not experience any thrashing. It will not be able to achieve the desired level of agent productivity because the system is resource bound. The actual scarce resource in this case being the rate at which it can launch calls although the scarce resource that the dialing algorithm will perceive is a lack of trunks.

While the invention has been described in terms of a single preferred embodiment, those skilled in the art will recognize that the invention can be practiced with modification within the spirit and scope of the appended claims.

Having thus described the invention, what we claim as new and desire to secure by Letters Patent is as follows:

1. In an outbound, predictive dialing call management system, a method for transferring a number of calls to dial determined by a call manager to an outbound telephone switch, wherein said outbound telephone switch has a rated call switching capacity of x number of calls per y unit of time where y is one hour or less, including the steps of:

establishing a call budget of a number of calls to dial per unit time by dividing the y unit of time into a plurality of discrete time increments and dividing the x number of calls among said plurality of discrete time increments;

transferring said number of calls to dial determined by said call manager to a budget queue;

transferring calls to dial in said budget queue to said outbound telephone switch at a rate that does not exceed the call budget for each of said plurality of discrete time increments.

2. A method as in claim 1 wherein the number of calls in each said call budget is approximately equal.

3. In an outbound, predictive dialing call management system, a method for transferring a number of calls to dial determined by a call manager to an outbound telephone switch, wherein said outbound telephone switch has a rated call switching capacity of x number of calls per y unit of time where y is one hour or less, including the steps of:

determining a number of calls to dial by means of a predictive algorithm;

establishing a call budge of a number of calls to dial per unit time by dividing the y unit of time into a plurality of discrete time increments and dividing the x number of calls among said plurality of discrete time increments;

transferring said number of calls to dial determined by said call manager to a budget queue;

transferring calls to dial in said budget queue to said outbound telephone switch at a rate that does not exceed the call budget for each of said plurality of discrete time increments;

reducing the number of calls to dial in said determining step when the number of calls in said budge: queue increases to a certain number of calls.

4. A method as in claim 3 wherein said predictive algorithm includes as a factor a number of trunks connected to said outbound telephone switch and said certain number of calls in said budget queue is a function of an apparent lack of said number of trunks.

* * * * *